(12) United States Patent
Henty

(10) Patent No.: US 8,698,656 B2
(45) Date of Patent: Apr. 15, 2014

(54) ENHANCED RANGE PASSIVE WIRELESS CONTROLLER

(75) Inventor: David L. Henty, Newport Beach, CA (US)

(73) Assignee: Ezero Technologies LLC, Irvine, CA (US)

( * ) Notice: Subject to any disclaimer, the term of this patent is extended or adjusted under 35 U.S.C. 154(b) by 1187 days.

(21) Appl. No.: 12/430,822

(22) Filed: Apr. 27, 2009

(65) Prior Publication Data

US 2009/0215395 A1    Aug. 27, 2009

Related U.S. Application Data

(60) Division of application No. 11/363,388, filed on Feb. 27, 2006, now Pat. No. 7,525,453, which is a continuation-in-part of application No. 09/978,615, filed on Oct. 16, 2001, now Pat. No. 7,006,014, which is a continuation-in-part of application No. 10/003,778, filed on Oct. 31, 2001, now Pat. No. 7,027,039, and a continuation-in-part of application No. 10/027,369, filed on Dec. 20, 2001, now abandoned.

(60) Provisional application No. 60/241,178, filed on Oct. 17, 2000, provisional application No. 60/244,611, filed on Nov. 1, 2000, provisional application No. 60/257,479, filed on Dec. 21, 2000.

(51) Int. Cl.
| | |
|---|---|
| H03K 17/94 | (2006.01) |
| H03M 11/00 | (2006.01) |
| G08C 19/12 | (2006.01) |
| H04L 17/02 | (2006.01) |
| G06F 3/02 | (2006.01) |
| G09G 5/00 | (2006.01) |

(52) U.S. Cl.
USPC ............. 341/22; 341/20; 341/173; 341/177; 345/168; 345/171

(58) Field of Classification Search
USPC ............. 341/20–35, 173–192; 345/168, 171; 400/486, 492
See application file for complete search history.

(56) References Cited

U.S. PATENT DOCUMENTS

| | | | | |
|---|---|---|---|---|
| 6,133,833 | A * | 10/2000 | Sidlauskas et al. | 340/572.1 |
| 6,531,964 | B1 * | 3/2003 | Loving | 340/12.51 |
| 6,617,962 | B1 * | 9/2003 | Horwitz et al. | 340/10.4 |

(Continued)

OTHER PUBLICATIONS

Author: G. School et al., Title: Wireless Passive SAW Sensor Systems for Industrial and Domestic Applications, Date: May 29, 1998, pp. 595-601.*

(Continued)

*Primary Examiner* — Hai Phan
*Assistant Examiner* — Franklin Balseca

(57) ABSTRACT

A wireless keyboard and reader combination comprises a keyboard having a plurality of keys, an antenna, and a plurality of passive transponder circuits, employing backscatter transmission coded in the time domain using a reflected series of pulses, coupled to the antenna and associated with the keys. For example, SAW transponders may be employed. The passive transponder circuits are selectively coupled to the antenna and provide a coded response identifying a key in response to key activation. An associated reader includes a source of an interrogating field applied to the antenna of the keyboard and a decoder for determining the coded response from the passive transponder circuits.

2 Claims, 6 Drawing Sheets

(56) References Cited

U.S. PATENT DOCUMENTS

| | | | |
|---|---|---|---|
| 6,708,228 B1 * | 3/2004 | Meyers et al. | 710/5 |
| 6,708,881 B2 | 3/2004 | Hartmann | |
| 6,756,880 B2 | 6/2004 | Hartmann | |
| 6,759,789 B2 | 7/2004 | Hartmann | |
| 6,919,802 B2 | 7/2005 | Hartmann et al. | |
| 6,937,615 B1 * | 8/2005 | Lazzarotto et al. | 370/465 |
| 6,958,696 B2 | 10/2005 | Hartmann et al. | |
| 6,966,493 B2 | 11/2005 | Hartmann | |
| 7,015,833 B1 * | 3/2006 | Bodenmann et al. | 341/20 |
| 2004/0069852 A1 | 4/2004 | Seppinen et al. | |

OTHER PUBLICATIONS

Klaus Finkenzeller, RFID Handbook, Fundamentals and Applications in Contactless Smart Cards and Identification, second edition, 2003, Wiley Pub., pp. 151-159 and 309-328.

* cited by examiner

ENHANCED RANGE PASSIVE WIRELESS CONTROLLER

RELATED APPLICATION INFORMATION

The present application is a divisional application of U.S. patent application Ser. No. 11/363,388 filed Feb. 27, 2006, U.S. Pat. No. 7,525,453, which is a continuation-in-part application of U.S. patent application Ser. No. 09/978,615 filed Oct. 16, 2001, U.S. Pat. No. 7,006,014, which claims the benefit pursuant to 35 USC §119(e) of the priority date of U.S. Provisional Patent Application Ser. No. 60/241,178, filed on Oct. 17, 2000, U.S. Provisional Patent Application Ser. No. 60/244,611, filed on Nov. 1, 2000 and U.S. Provisional Patent Application Ser. No. 60/257,479, filed on Dec. 21, 2000, the disclosures of which are hereby expressly incorporated herein by reference. The present application is also a continuation-in-part application of U.S. patent application Ser. No. 10/003,778 filed Oct. 31, 2001, U.S. Pat. No. 7,027,039 and Ser. No. 10/027,369 filed Dec. 20, 2001 now abandoned the entire disclosures of which are hereby expressly incorporated herein by reference.

BACKGROUND OF THE INVENTION

1. Field of the Invention

The present invention relates to wireless controllers.

2. Description of the Prior Art and Related Information

Wireless keyboards have a number of advantages over the more common wire connected keyboards employed in computer systems. First of all, wireless keyboards offer more flexibility to the user to position him or her self relative to the computer. This can reduce strain and tiredness associated with computer use. Also, wireless keyboards reduce the amount of wires connected over or creates a cleaner look to the overall system and can give the computer system a more sophisticated and/or expensive look. This avoidance of wiring becomes increasingly significant as more add on peripherals are included in typical computer systems which can result in workplace clutter.

The wireless keyboards currently available are either infrared based or RF based transmission systems. The infrared systems are the simplest and least expensive, however, they require a line of sight to the receiver. This can result in inconsistent transmission as the keyboard is moved or if other objects block the transmission path. RF systems do not suffer from this problem but are more expensive than infrared systems. In particular, the reliability of transmission in RF systems at a given range depends on the RF frequency and the power and quality of the transmitter. Therefore, maintaining transmission reliability requires more expensive higher frequency transmitters and/or higher power transmitters. Nonetheless, RF systems are increasingly being used for wireless keyboards over infrared systems due to their performance advantages.

Undoubtedly the primary reason that wireless keyboards have not displaced wire connected keyboards to a greater extent is the need for replacing batteries. When batteries fail in a wireless keyboard computer system the system is useless until the batteries are replaced. This is obviously a significant inconvenience when the battery failure is not expected. Also, keyboards typically continuously scan the matrix of keys to detect key depression. Therefore, even when there is no data entry from the keyboard battery power is being used for key scanning. Therefore, battery lifetime is inherently limited in wireless keyboards.

As a result of these limitations wireless keyboards have not been able to fulfill the potential of replacing wired keyboards in computer systems.

SUMMARY OF THE INVENTION

In one aspect the present invention provides a computer system comprising a computer receiver adapted to receive wireless input from first and second input devices employing different RF wireless communication modes and including shared circuitry for processing both communication modes. The receiver outputs an interrogating field and at least one of the first and second wireless input devices modulates the interrogating field which is detected by the receiver. The receiver communicates with the first device in a near field communication mode and the receiver communicates with the second device in a far field communication mode and the receiver comprises a first antenna adapted for near field communication and a second antenna adapted for far field communication. The first input device may be a wireless mouse and the second input device a wireless keyboard or the first input device may be a wireless keyboard and the second input device a wireless mouse.

Further features and aspects of the invention are also provided as will be appreciated from the following detailed description of the invention.

DETAILED DESCRIPTION OF THE INVENTION

Figure 1A:
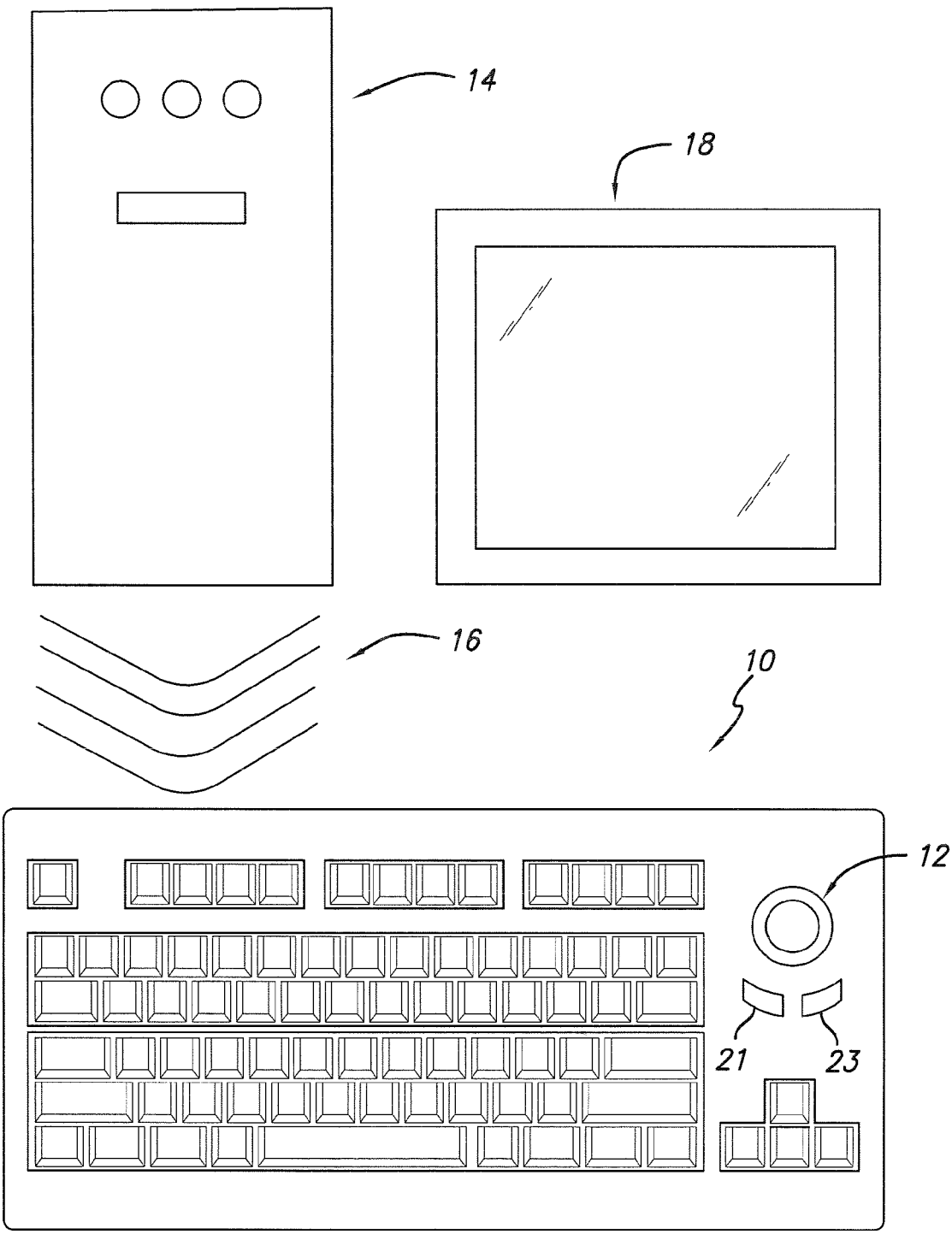
FIGS. 1A and 1B are a drawings of a computer system with a passive wireless keyboard in accordance with two embodiments of the present invention.
Figure 1B:
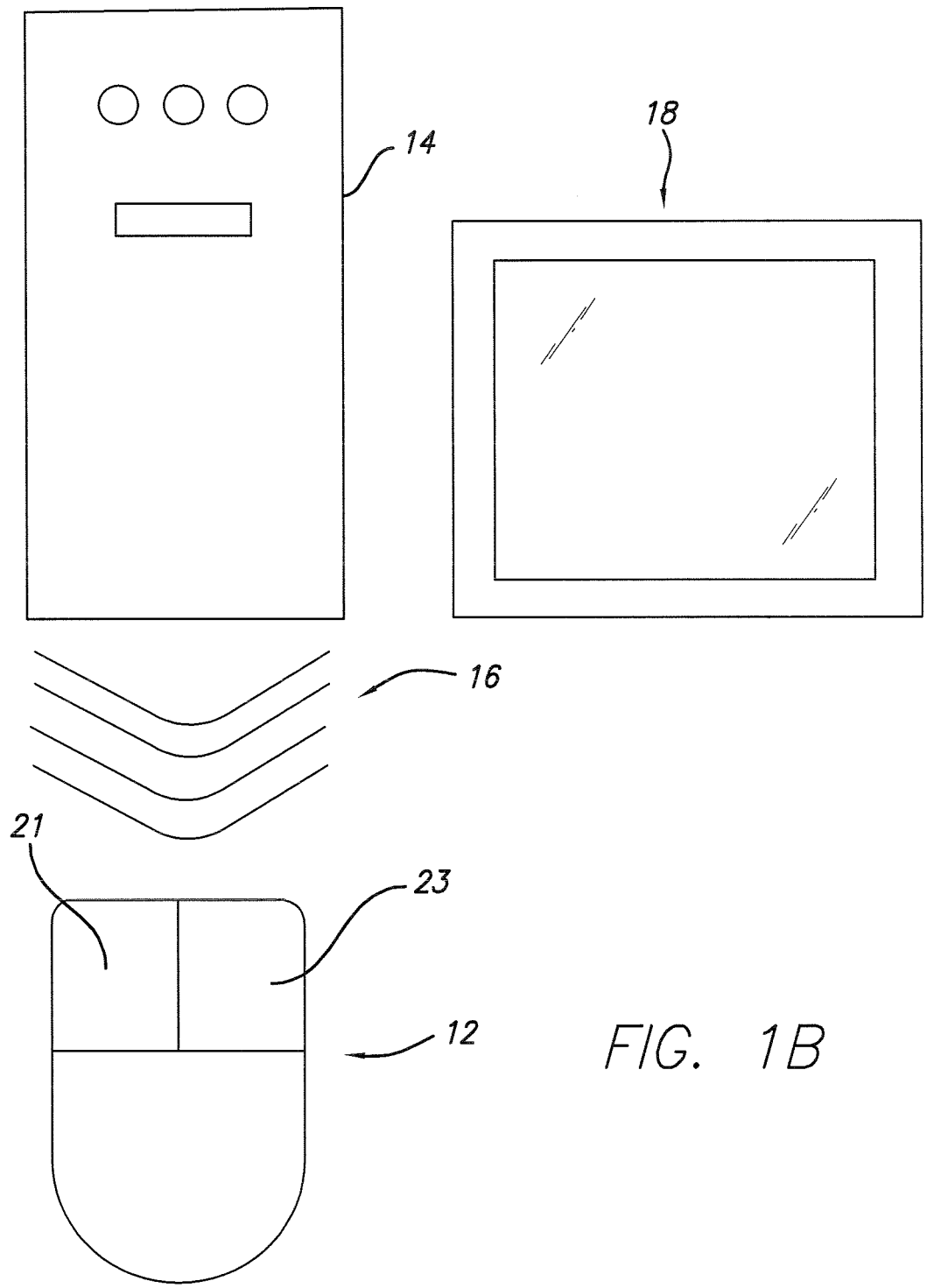

Referring to FIGS. 1A and 1B, a computer system incorporating a passive wireless keyboard 10 and a wireless mouse 12 is illustrated. Keyboard 10 may be a QWERTY keyboard of an integral one piece conventional construction or may incorporate a folding design such as disclosed in U.S. Pat. No. 6,094,156 the disclosure of which is incorporated herein by reference in its entirety. The computer system as illustrated also includes a housing 14 which includes the processor, hard disk drive, and other components in a conventional computer system, as well as a reader unit which is the source of an interrogating field 16 which is used to interrogate the passive keyboard 10 and receive wireless transmission from wireless mouse 12. The wireless mouse may employ passive or active wireless transmission as described below. The computer system also includes a monitor 18 which may be a CRT or LCD type of display or other display known in the computer art. Interrogating field 16 is an RF modulated field generated by the reader and applied to a suitable antenna, contained within housing 14. Optionally the reader and/or the antenna may be contained within monitor 18. Alternatively, the reader may be incorporated in an add-on unit which interfaces with the computer housing 14 through an available port, such as a USB port, or the keyboard input.

Each key in keyboard 10 couples a passive transponder to the interrogating field 16 when a key is activated and provides a coded response to the reader which indicates the key activated. For example, the activation of a key in the keyboard 10 may close a switch that connects the transponder corresponding to that key to its antenna thereby allowing it to couple to the interrogating field 16 and provide a coded response to the reader in the computer housing 14 or may couple/decouple the antenna by tuning/detuning the circuit. Each transponder corresponding to a given key in the keyboard 10 has a unique code identifying the key which is read by the reader and thus provides an identification of the specific key activation to the computer processor.

A variety of passive transponder tags (or RFID tags) are known, however, most of these are limited in range. Such passive tags are primarily used in security systems and inventory tracking. Such tags typically include an antenna and integrated circuit which are combined in a small package and provided at a relatively low-cost. The antenna is used by the passive transponder to receive energy from the interrogating field which energy is used by the transponder to provide the coded response to the interrogating signal. The need for the passive transponder to receive energy from the interrogating field is a primary range limitation, often limiting the read range to a few cm where a small size inductive antenna is used in the reader to supply power. Longer range systems often employ very large reader antennas, for example, in passive RFID tag based security access systems or theft detection systems reader antennas are typically dimensioned on the order of size of a doorway or access portal. It is desirable to increase the range of the wireless keyboard without employing such large reader antennas. Several approaches to range increases are described in the above noted U.S. patent application Ser. No. 09/978,615 ('615 application) which take advantage of the different aspects of the present application. SAW (Surface Acoustic Wave) passive transponder tags have advantageous features for combination with the present invention. SAW tags and readers employ backscatter transmission coded in the time domain using a reflected series of pulses which are delayed to avoid noise due to reflections from the environment. SAW tags do not need power from the interrogating field so they can have increased read range. SAW tags as well as readers suitable for reading the response from such tags are well known and commercially available. For example, such tags and readers are available from RF SAW, Inc. Also, the following patents disclose SAW RFID tags and readers; U.S. Pat. No. 6,966,493, U.S. Pat. No. 6,958,696, U.S. Pat. No. 6,919,802, U.S. Pat. No. 6,759,789, U.S. Pat. Nos. 6,756,880, 6,708,881, the disclosures of which are incorporated herein by reference in their entirety. Also, the RFID Handbook, second edition, 2003, Wiley Pub., by Klaus Finkenzeller discloses details of SAW RFID tags and readers, the disclosure of which is incorporated herein by reference (the relevant portions thereof will be readily appreciated by those skilled in the art). A time delayed backscatter modulator may also be implemented on the keyboard using discrete components including a delay line coupled to the antenna. Other backscatter tags and reader systems may also be employed. Various backscatter modulator circuit designs and approaches are known; for example, as set out in the above noted RFID Handbook. In addition to these and other known teachings the teachings of U.S. Pat. No. 6,243,012 may be employed, the disclosure of which is incorporated herein by reference. Also, non backscatter systems may be employed and several are described in the '615 application. Selection of the system will involve the desired range and cost of the application.

Figure 2:
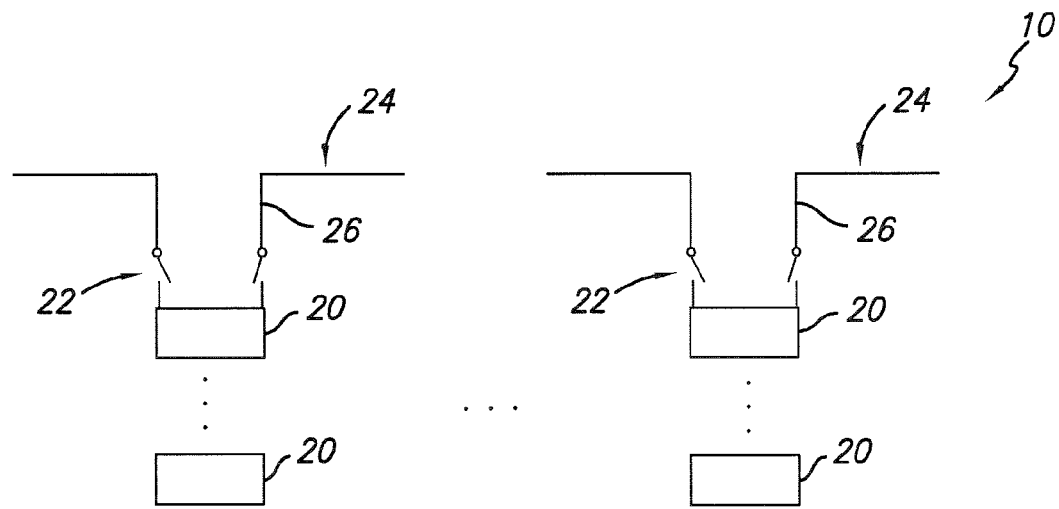
FIG. 2 is a cutaway view of the wireless keyboard of FIG. 1A or 1B illustrating the transponder ID tags and antenna employed in the keyboard.

Referring to FIG. 2 a portion of keyboard 10 is illustrated showing a portion of an array of passive transponder ID tags 20. Such tags may comprise SAW tags and specifics of the design of tags 20 may be found in the above noted United States patents. Each ID tag 20 comprises a chip storing a unique code for the specific key of the keyboard 10 to which the tag 20 corresponds. Also as shown each tag 20 is coupled via a switch 22 to an antenna 24. When a key is activated by the keyboard user the depression of the key closes switch 22 thereby coupling the individual ID tag 20 to the antenna 24. This allows the tag to couple to the interrogating field and reflect the field with a modulated response to provide its unique code to the reader. Each tag 20 may have its own antenna. As antenna size can limit read range, however, it is generally desirable to have as large an antenna reflective signature as possible associated with each tag. This may be achieved by providing a common antenna to which is coupled a plurality of individual tags 20. This allows an antenna 24 to be dimensioned larger than in typical passive RFID applications up to substantially the entire size of the keyboard which can provide substantial increases in coupling to the interrogating field and corresponding increases in the read distance and read speed and integrity. Although the antenna 24 is illustrated as a simple dipole antenna 24 it will be appreciated that other antenna types are possible, including a multi-wire folded dipole. Also, the antenna 24 may be formed on a separate layer of the keyboard from the tags 20 with a connection 26 provided between the antenna layer and the layer on which the tags 20 are formed allowing the use of a patch antenna 24 or an antenna comprising an array of patches or microstrip lines. Whether the antenna 24 is on the same substrate as the tags 20 or a separate substrate the antennas may advantageously be formed using printed circuit board techniques to ease assembly and reduce costs.

Figure 3:
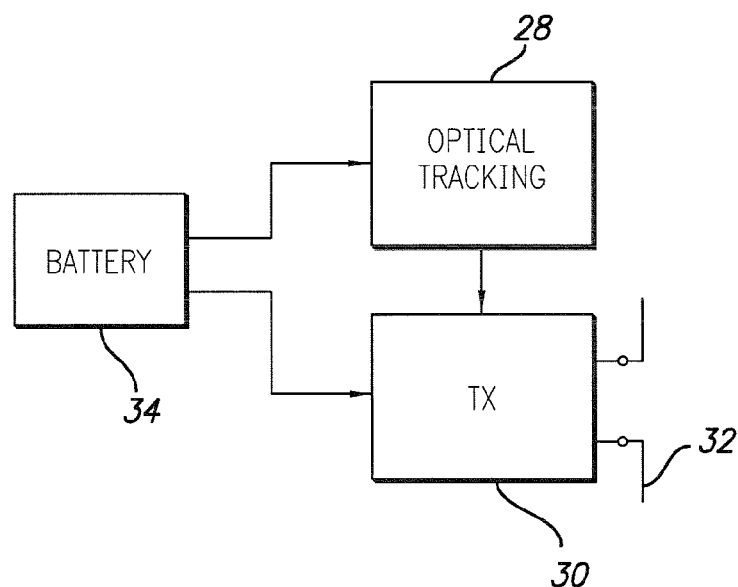
FIG. 3 is a schematic drawing of a circuit of the wireless mouse employed in one embodiment of the computer system of FIG. 1B.

Still referring to FIG. 2, in one embodiment of tag antenna 24 separate antennas 24 may be provided for different groups of keys. The number of separate antennas provided may be chosen to reduce or eliminate the possibility of simultaneously activated keys sharing an antenna during normal keyboard usage. This may reduce interference in the read operation between such simultaneously activated keys. For example, for a typical computer keyboard with CTRL, ALT and SHIFT keys adapted for use together with other keys, these may each be coupled to a separate antenna 24. A separate antenna 24 could then couple to the remaining keys, including all the text keys. Additional or fewer antennas may be provided for specific keyboard functionality. Alternatively, the antenna/key grouping may be chosen for optimal coupling and/or optimal layout of a printed circuit with the antennas and tag connections on the keyboard. For example, the keys may be coupled in columns to antennas arranged in rows along the top (as schematically illustrated) and bottom of the keyboard. Preferably, as noted above, the antennas in total exploit a substantial portion of the keyboard area to maximize read range Referring to FIG. 3, an implementation of a wireless mouse 12 circuit is illustrated. If mouse 12 employs mechanical position encoders the use of passive transmission of the position information may be employed as described in more detail in U.S. patent application Ser. No. 10/003,778. If an optical position encoder is desired an active backscatter transmission may be employed as shown in FIG. 3. A conventional optical tracking circuit 28 may be employed which is coupled to an active backscatter transmitter comprising modulator 30 and antenna 32. The active backscatter modulator may employ the same general design as passive backscatter modulators described above, e.g. the '012 patent or RFID Handbook, with the power provided from the battery and the modulation input coming from the position input rather than stored in an IC. The optical tracking circuit and modulator are powered by battery 34, however, the transmitter does not need to power the transmission through the antenna since backscatter/reflective transmission of the interrogating field is employed. This embodiment has the advantage of reduced power consumption over conventional wireless optical mouse systems which power RF transmission with a battery. Such systems are known to have relatively short battery lifetime and accordingly the extended battery lifetime with the present embodiment is a desirable improvement. Also, a shared reader may be employed with the wireless keyboard.

Figure 4:
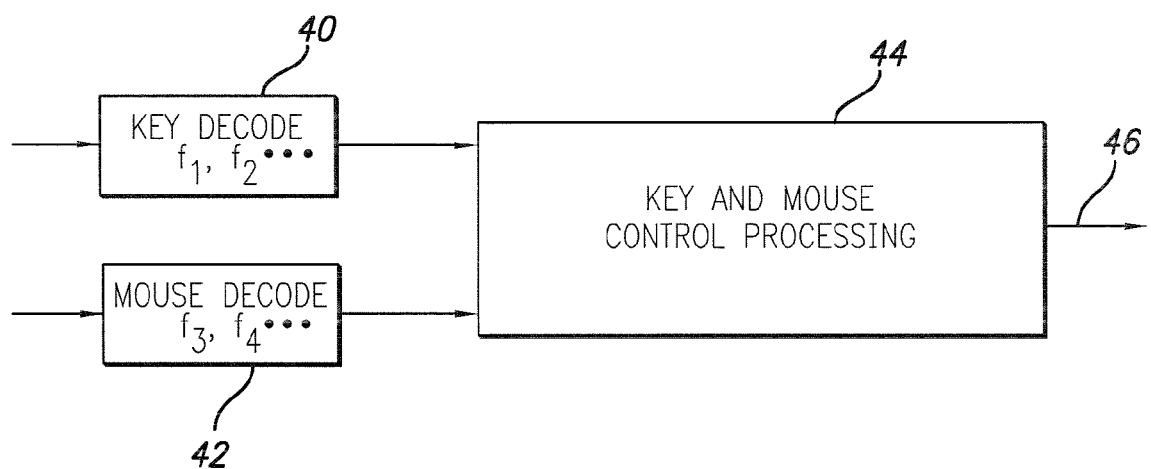
FIG. 4 is a block diagram of the tag reader electronics employed in the computer system of FIG. 1A or 1B.

Referring to FIG. 4 a reader block diagram is illustrated. As noted above reader designs are known and are described in the above patents and in the above noted RFID Handbook, by Klaus Finkenzeller (chapter 11), and need not be described in detail herein; however, FIG. 4 illustrates aspects of the reader adapted for the present application. As shown the reader includes a key reader and decoder 40 and a mouse reader and decoder 42. If a SAW type tag is employed on the keyboard 10 and an active modulated backscatter system employed for wireless mouse 12, the interrogating field will be pulsed for the keyboard and continuous for the mouse and appropriate reader circuits employed. These may each be operable at different frequencies. Also each may have plural frequencies f1-fn. Plural frequencies for the key reader may prevent interference from simultaneously operated keys and may be limited to commonly activated keys such as ctrl, shift, alt, etc. Mouse decoder in turn may use plural frequencies as described in the '778 application. Other techniques for preventing interference from multiple tags being read simultaneously are known and may be employed instead of assigning unique frequencies to the commonly activated tags. For example, a protocol where a tag issues a brief response in a unique time slot or where a random response timing is used can minimize inter-tag interference without separate frequencies.

The decoded key and mouse information is provided to control processing circuit 44 which converts the decoded information to conventionally formatted key and mouse control data which is provided to the computer processor on line 46. Some or all of the functions of circuit 44 (as well as some functions of decoders 40, 42) may be provided in the computer processor, however, and this may provide cost advantages.

Figure 5:
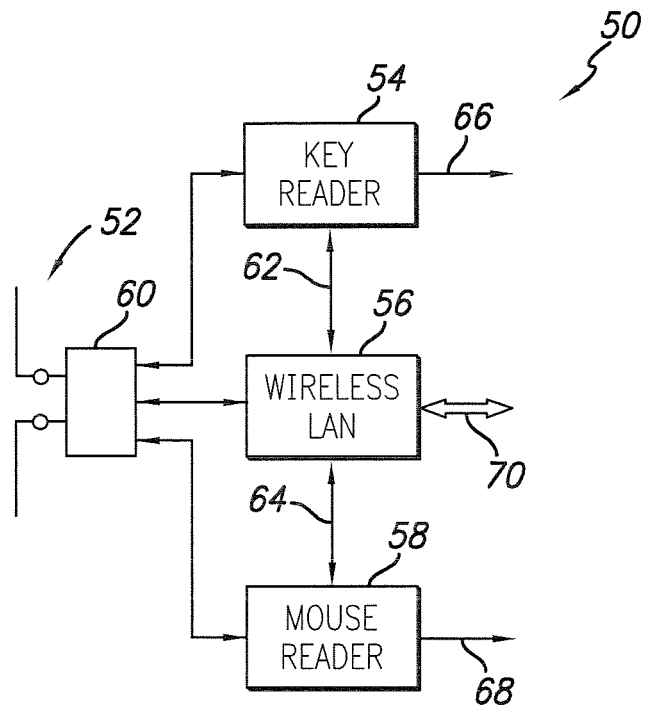
FIG. 5 is a block diagram of the tag reader in an alternate embodiment.

Referring to FIG. 5 a reader block diagram is illustrated which shares circuitry with a wireless networking circuit. Such wireless networking circuits are well known, for example as defined in the WiFi specification, and as used herein also includes systems such as Bluetooth. 2.45 GHz is a commonly used frequency for such systems and 2.45 GHz SAW tags are also available. This combined circuit has advantages in space and cost for computer systems having such a wireless networking capability and for example the wireless network and key/mouse reader circuitry may be configured on a single circuit board. As shown the combined reader and wireless networking circuit 50 may include a shared antenna 52 coupled to key reader circuit block 54, wireless network circuit block 56 and mouse reader circuit block 58 via selective coupler 60. If the same antenna is used for transmit and receive the coupler may include a directional coupler and a switch (the double arrow lines may comprise separate signal paths from the directional coupler and are illustrated in this manner for convenience of illustration). The switching circuitry receives timing control signals from either of the circuit blocks which timing is communicated between the blocks via lines 62, 64. If the respective circuit blocks operate at different frequencies the selective coupler may also include filters to block the signal components of the other circuit blocks. The outputs of the key and mouse reader are provided to the computer system processor along lines 66, 68 and the wireless network bidirectional communication is along line 70. Although a shared antenna provides space advantages and some cost savings additional functions may be shared between circuit blocks. For example, circuit block 56 may control all transmit signals with separate decode blocks used for receiving and decoding functions. Alternatively, separate transmit circuits may be provided but a common decode block employed in circuit block 56. Finally, all functions may be implemented in a common block 56.

A discrimination processing may be implemented by the readers of FIG. 4 or 5 which allows multiple wireless keyboards to be used in relatively close proximity without interference. A first processing approach takes advantage of the distance detection feature of SAW tags and readers. In this approach the reader detects a coded response and the distance and compares it to a predetermined maximum distance, e.g., 6, 8 or 10 feet. If the distance exceeds this amount the key detection is rejected. Alternatively the reader may output distance and key codes to the computer system processor which then compares the distance to the defined maximum and accepts or rejects the key code. In either case the distance may be user settable but this user distance setting capability may be more readily implemented where the distance discrimination is made in the computer system processor. Another discrimination processing approach may employ using different codes in different keyboards and storing the valid codes for the keyboard in a table in the reader or computer system. In this approach the reader detects a coded response and compares it to the table of valid codes and accepts or rejects the key code. As in the prior approach this discrimination processing alternatively may be performed by the computer system processor. To allow switching of keyboards between computers the table may be stored in a nonvolatile memory on the keyboard accessible by the computer system via, e.g., a USB cable, or may be contained in a device driver, e.g., on a CD ROM or other storage, which ships with the keyboard.

Figure 6A:
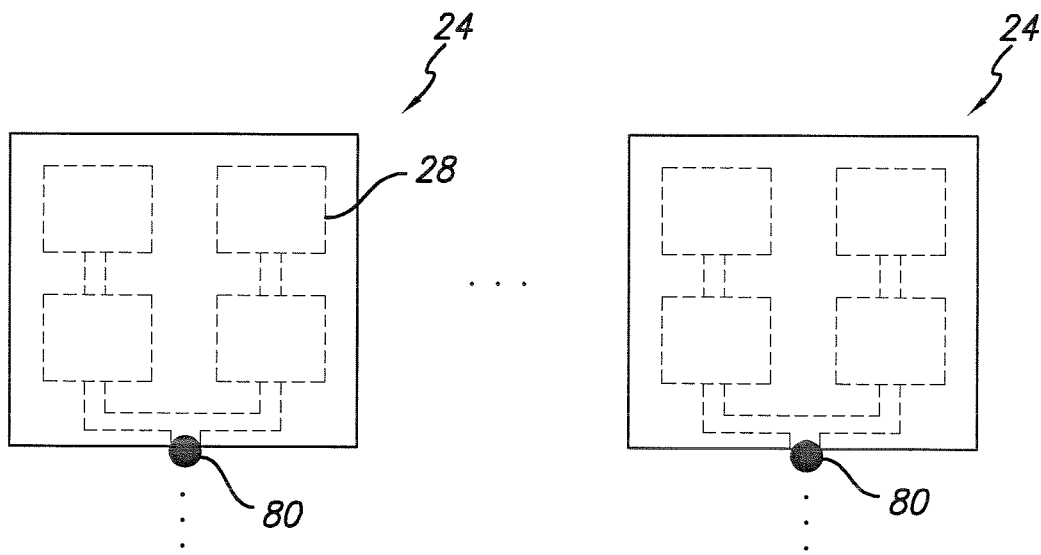
FIGS. 6A and 6B are top and sectional views of a multi-layer keyboard employing a planar antenna design.
Figure 6B:
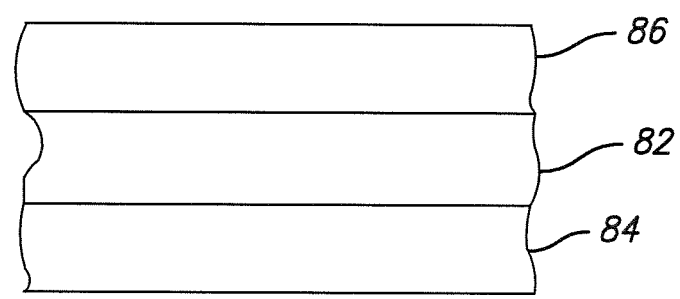
Figure 1A:
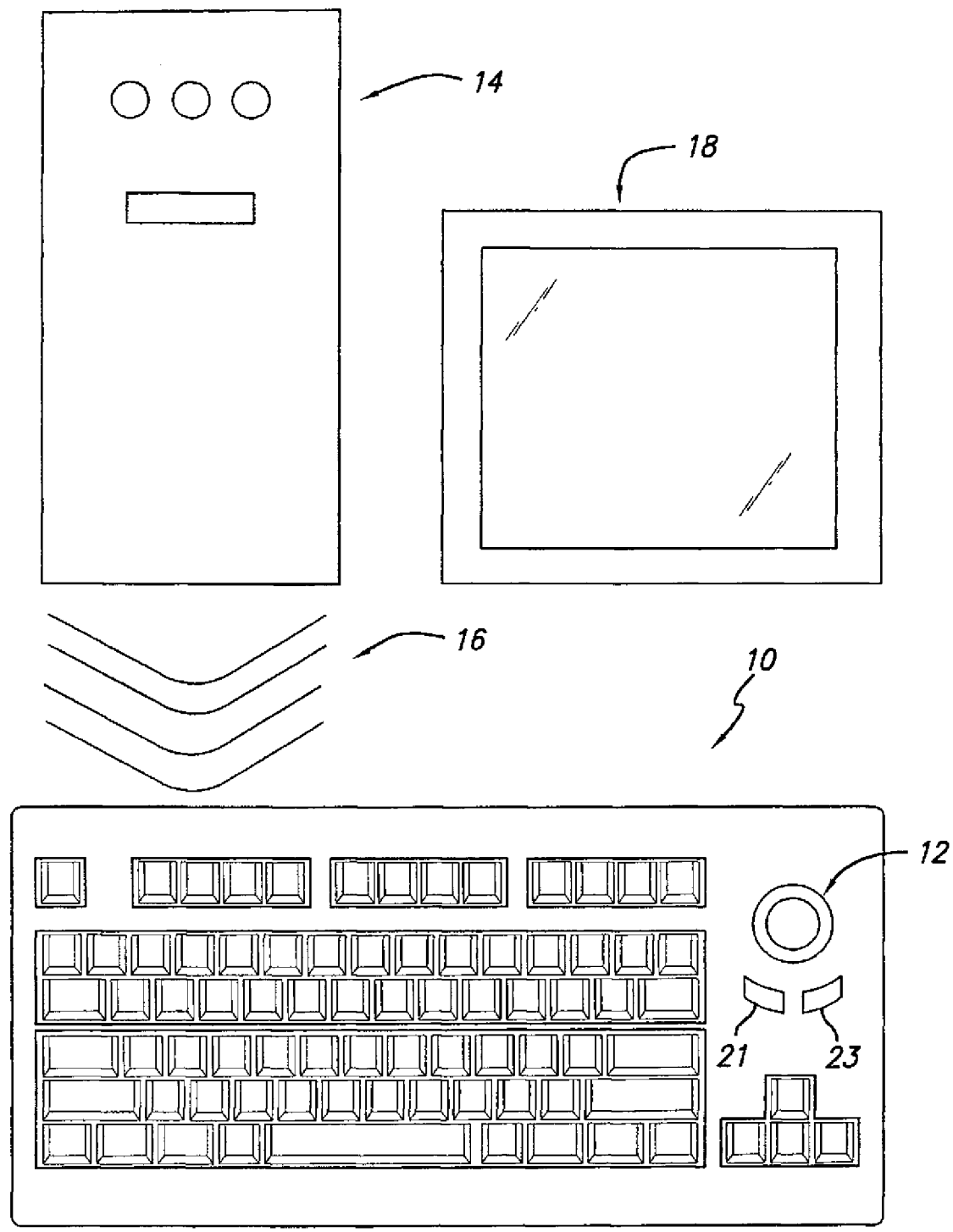
Figure 1B:
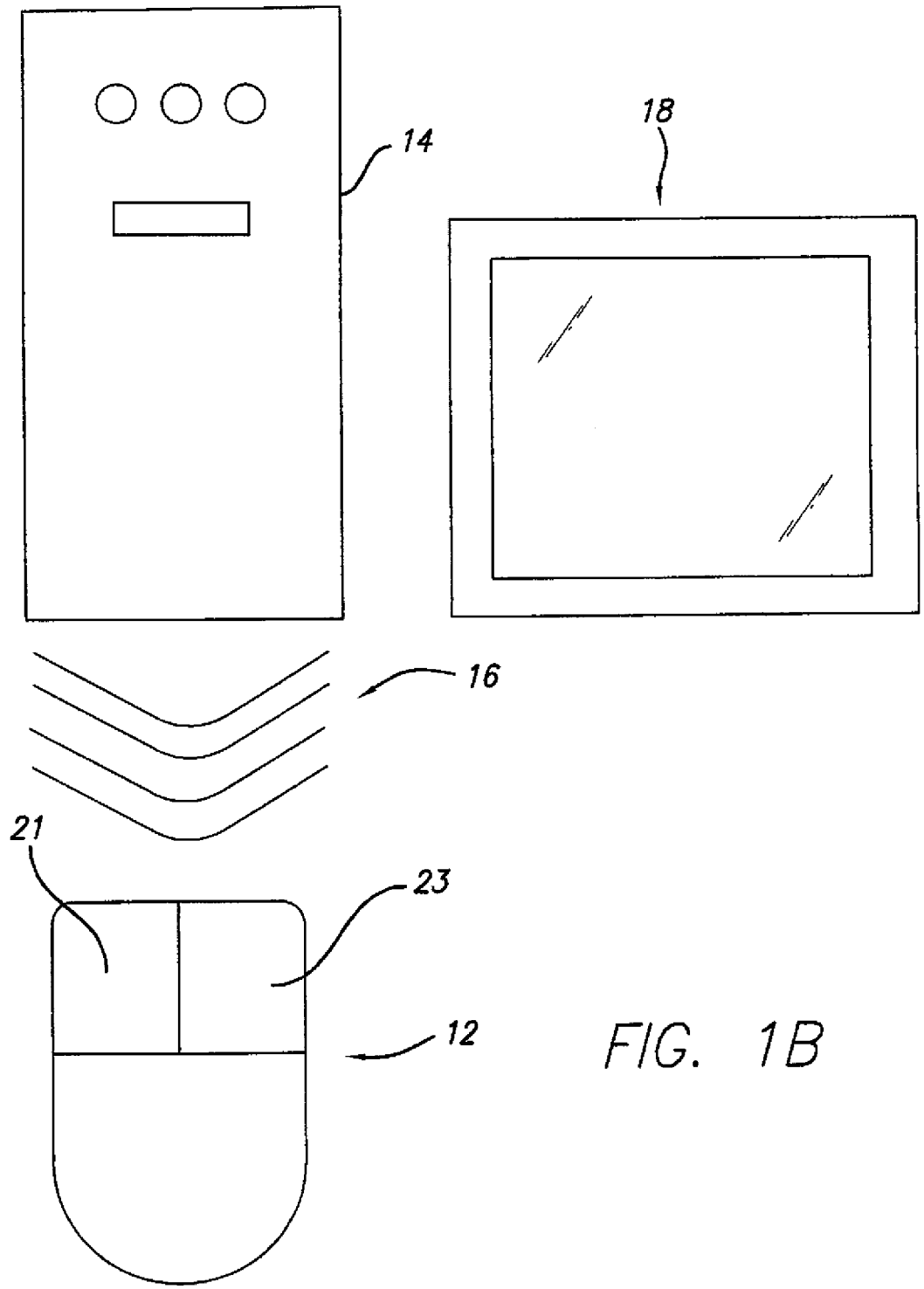
Figure 2:
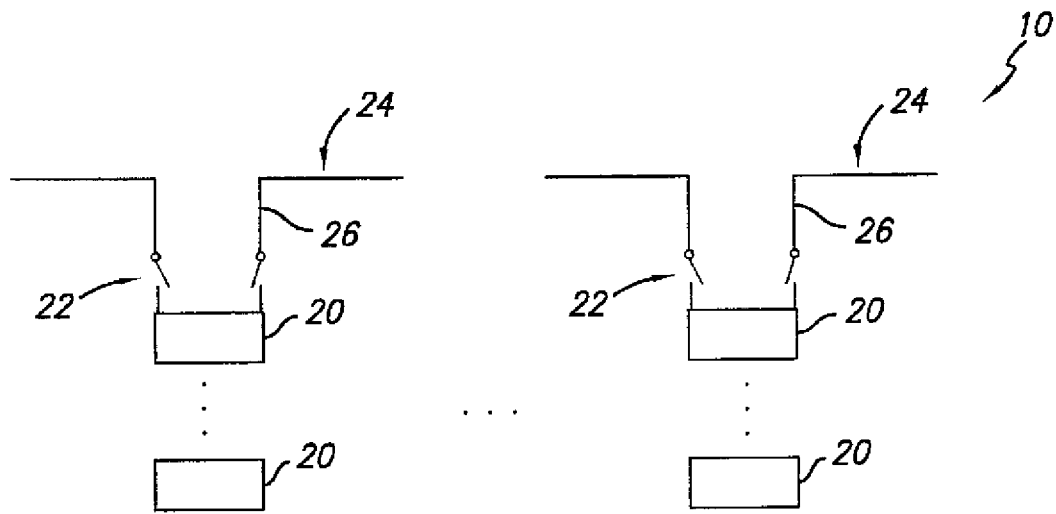
Figure 3:
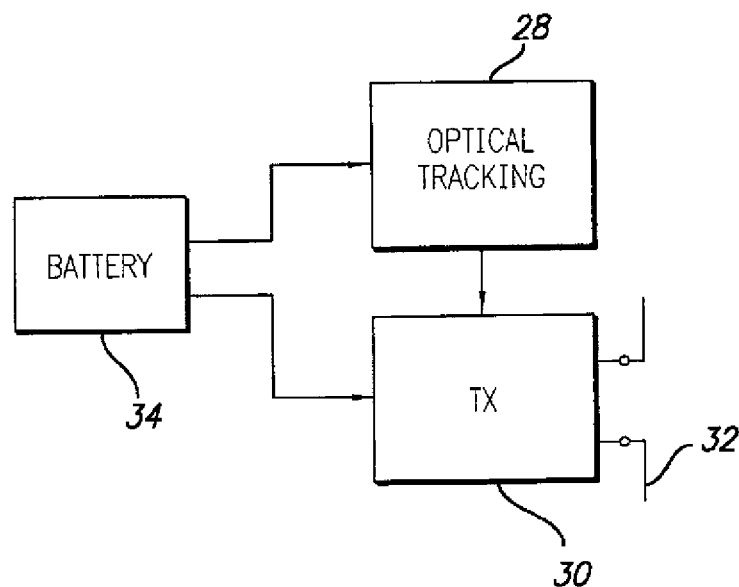
Figure 4:
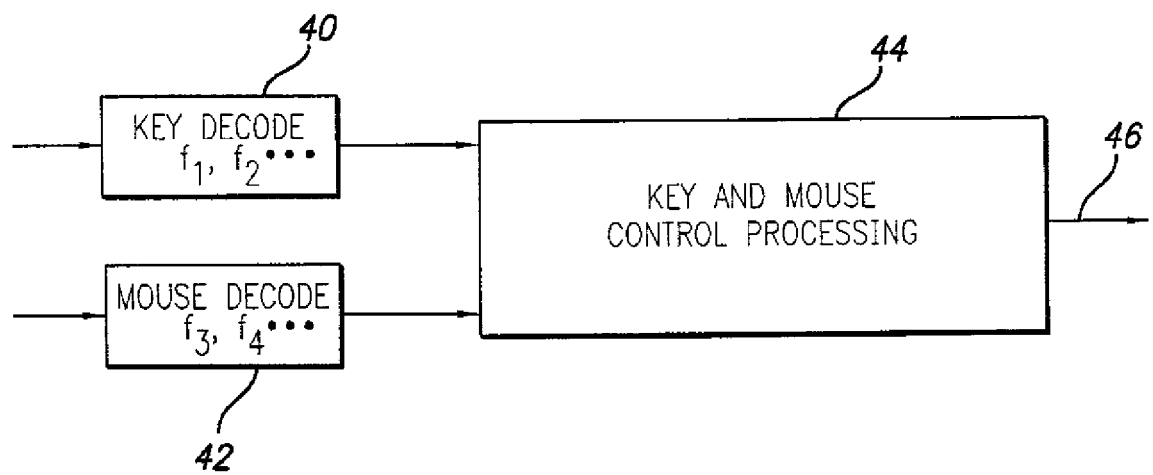
Figure 5:
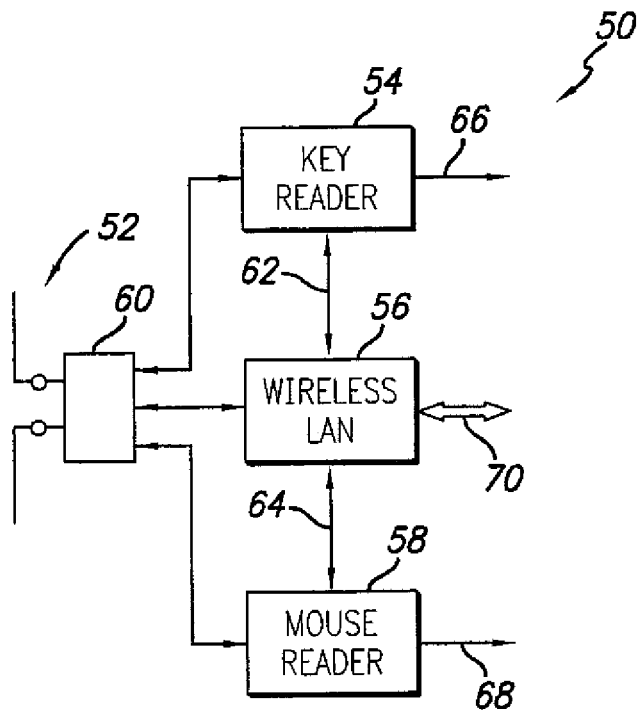
Figure 7:
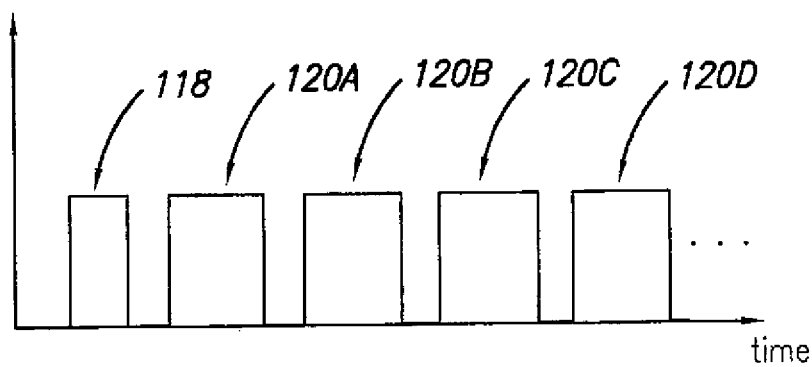
Figure 6A:
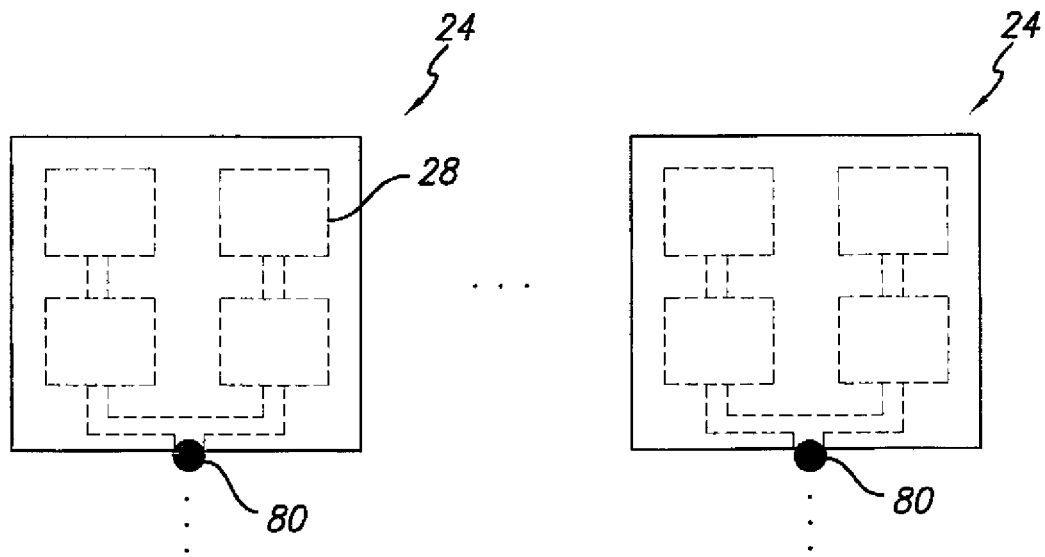
Figure 6B:
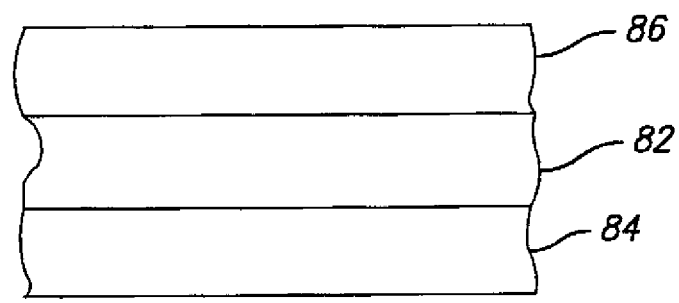

FIGS. 6A and 6B are top and side sectional views of a keyboard 10 employing a multi-layer structure and a planar antenna design. Referring first to FIG. 6A, a layer of keyboard 10 is illustrated employing a planar antenna pattern thereon. The generally planar tag antenna 24 may employ known patch antenna or multi-stripline designs which may be configured on the keyboard housing or part of the housing. For example, patch antenna designs are described in the above noted RFID Handbook (Chapter 4). The planar pattern may be generally split across the keyboard into columns or rows of antennas 24 or antenna elements 28. Other configurations are also possible. The antenna configuration will be chosen for the specific implementation to maximize reflective coupling to the interrogating field from the reader. A second layer of keyboard 10 may comprise tags 20 and switches 22 connected to the tag antenna by connection 26, as described in relation to FIG. 2 above. The tag layer 82 may be configured on top of the antenna layer 84 as illustrated in FIG. 6B and connection 26 (FIG. 2) may connect to antenna 24 through conductive vias 80. Tags 20, switches 22 and connection 26 may be formed on a suitable substrate. The layer 86 with the keys thereon (shown in FIG. 1A) is configured on top of the tag layer with the keys aligned with switches 22.

As noted above antenna 24 may be optimized for the transmission of the data back to the reader, for example, to transmit data via backscatter modulation. For example, if a 2.45 GHz interrogating field is used approximately a half wavelength antenna or antenna element dimension may be employed. In addition to a patch antenna, for example, antenna 24 may be a half wavelength dipole antenna array configured over a substantial portion of the keyboard to provide a strong reflected signal. Plural antennas 24 may also be provided each respectively coupled to one or more circuits as described above. Plural antennas 24 may also be provided each respectively having a different orientation to reduce sensitivity to keyboard orientation. Also, other antenna designs may be employed, e.g., a bowtie antenna, multi-element half wavelength dipole, or folded dipole antenna design may be employed.

SAW tags and readers employ time domain decoding and this may be used to discriminate simultaneously activated keys by the use of unique time slots for simultaneously activated keys. This feature may exploit the teachings of FIG. 17 of the '615 application reproduced as FIG. 7 herein. The pattern illustrated may comprise a timing signal encoded in the reflective pattern in a SAW tag circuit. Timing 118 may indicate the beginning of the SAW read window (as initiated by timing circuitry in the reader to discriminate noise) and, for example, slot or code 120A may correspond to a first multi-function key (e.g., Ctrl), 120B a second multi-function key (e.g., Shift), 120C a third multi-function key (e.g., Alt), and 120D the alpha numeric keys (e.g., in a QWERTY keyboard).

It will be appreciated from the foregoing that the above described embodiments are purely illustrative examples and a variety of different implementations of both the system employing the keyboard, the reader and the keyboard itself are possible. For example, with respect to the overall system, depending on the keyboard read range of the system as implemented, the system employing the keyboard may also comprise an entertainment system as described in the above noted '156 patent, incorporated herein by reference, with the keyboard providing remote control input functions as described therein. Such an entertainment system may include a game system and the keys game control keys. Also, a variety of computing devices such as so called internet appliances and other desktop systems may employ the invention. Also, simpler controllers may employ the manually activated tag and reader as described with the manually activated input coupling the tag to the antenna as described to wirelessly initiate a control function with a coded response. Such a controller may have a single manual input such as a key or switch or plural manual inputs. Variations in the reader and tag implementations and layouts in turn are too numerous to describe in detail including a variety of different combinations of transmission schemes, antenna designs, modulation schemes, frequency ranges, etc.

What is claimed is:

1. A computer system, comprising:
  a computer receiver adapted to receive wireless input from first and second input devices employing different RF wireless communication modes and including shared circuitry for processing both communication modes,
  said receiver outputting an interrogating field and wherein at least one of said first and second wireless input devices modulates said interrogating field which is detected by said receiver, wherein
  the receiver communicates with the first device in a near field communication mode and wherein the receiver communicates with said second device in a far field communication mode and the receiver comprises a first antenna adapted for near field communication and a second antenna adapted for far field communication,
  wherein said first input device is a wireless mouse and said second input device is a wireless keyboard, or said first input device is a wireless keyboard and said second input device is a wireless mouse.

2. A computer system as set out in claim 1, wherein a second interrogating field is provided by the receiver and is modulated by the second device in the second communication mode.

* * * * *

UNITED STATES PATENT AND TRADEMARK OFFICE
CERTIFICATE OF CORRECTION

PATENT NO. : 8,698,656 B2
APPLICATION NO. : 12/430822
DATED : April 15, 2014
INVENTOR(S) : Henty Page 1 of 13

It is certified that error appears in the above-identified patent and that said Letters Patent is hereby corrected as shown below:

Please delete patent 8698656 in its entirety and insert patent 8698656 in its entirety as shown on the attached pages.

Signed and Sealed this
Thirteenth Day of January, 2015

Michelle K. Lee
*Deputy Director of the United States Patent and Trademark Office*

CERTIFICATE OF CORRECTION (continued)

(12) United States Patent  
Henty

(10) Patent No.: US 8,698,656 B2  
(45) Date of Patent: Apr. 15, 2014

(54) COMPUTER SYSTEM WITH NEAR FIELD AND FAR FIELD COMMUNICATION

(75) Inventor: David L. Henty, Newport Beach, CA (US)

(73) Assignee: Ezero Technologies LLC, Irvine, CA (US)

(*) Notice: Subject to any disclaimer, the term of this patent is extended or adjusted under 35 U.S.C. 154(b) by 1187 days.

(21) Appl. No.: 12/430,822

(22) Filed: Apr. 27, 2009

(65) Prior Publication Data

US 2009/0215395 A1 Aug. 27, 2009

Related U.S. Application Data

(60) Division of application No. 11/363,388, filed on Feb. 27, 2006, now Pat. No. 7,525,453, which is a continuation-in-part of application No. 09/978,615, filed on Oct. 16, 2001, now Pat. No. 7,006,014, which is a continuation-in-part of application No. 10/003,778, filed on Oct. 31, 2001, now Pat. No. 7,027,039, and a continuation-in-part of application No. 10/027,369, filed on Dec. 20, 2001, now abandoned.

(60) Provisional application No. 60/241,178, filed on Oct. 17, 2000, provisional application No. 60/244,611, filed on Nov. 1, 2000, provisional application No. 60/257,479, filed on Dec. 21, 2000.

(51) Int. Cl.  
*H03K 17/94* (2006.01)  
*H03M 11/00* (2006.01)  
*G08C 19/12* (2006.01)  
*H04L 17/02* (2006.01)  
*G06F 3/02* (2006.01)  
*G09G 5/00* (2006.01)

(52) U.S. Cl.  
USPC ............ 341/22; 341/20; 341/173; 341/177; 345/168; 345/171

(58) Field of Classification Search  
USPC ............ 341/20–35, 173–192; 345/168, 171; 400/486, 492  
See application file for complete search history.

(56) References Cited

U.S. PATENT DOCUMENTS 6,133,833 A * 10/2000 Sidlauskas et al. ......... 340/572.1  
6,531,964 B1 * 3/2003 Loving ....................... 340/12.51  
6,617,962 B1 * 9/2003 Horwitz et al. ............. 340/10.4

(Continued)

OTHER PUBLICATIONS

Author: G. School et al., Title: Wireless Passive SAW Sensor Systems for Industrial and Domestic Applications, Date: May 29, 1998, pp. 595-601.*

(Continued)

*Primary Examiner* — Hai Phan  
*Assistant Examiner* — Franklin Balseca

(57) ABSTRACT

A computer system including a receiver adapted to wirelessly communicate with input devices in near field and far field communication modes is disclosed. The receiver includes a first antenna adapted for near field communication and a second antenna adapted for far field communication. The input devices may be a wireless keyboard or wireless mouse.

2 Claims, 6 Drawing Sheets

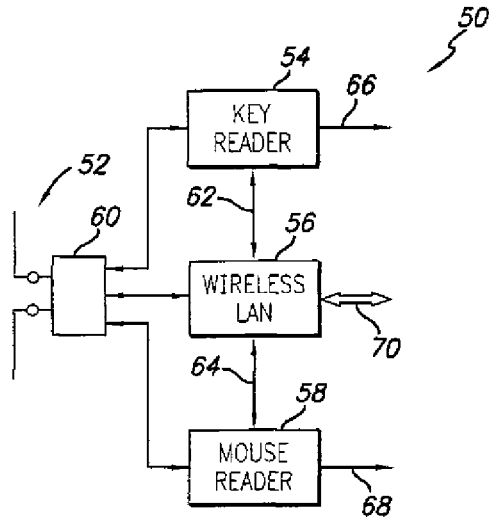

(56) References Cited

U.S. PATENT DOCUMENTS

| | | | |
|---|---|---|---|
| 6,708,228 B1 * | 3/2004 | Meyers et al. | 710/5 |
| 6,708,881 B2 | 3/2004 | Hartmann | |
| 6,756,880 B2 | 6/2004 | Hartmann | |
| 6,759,789 B2 | 7/2004 | Hartmann | |
| 6,919,802 B2 | 7/2005 | Hartmann et al. | |
| 6,937,615 B1 * | 8/2005 | Lazzarotto et al. | 370/465 |
| 6,958,696 B2 | 10/2005 | Hartmann et al. | |
| 6,966,493 B2 | 11/2005 | Hartmann | |
| 7,015,833 B1 * | 3/2006 | Bodenmann et al. | 341/20 |
| 2004/0069852 A1 | 4/2004 | Seppinen et al. | |

OTHER PUBLICATIONS

Klaus Finkenzeller, RFID Handbook, Fundamentals and Applications in Contactless Smart Cards and Identification, second edition, 2003, Wiley Pub., pp. 151-159 and 309-328.

* cited by examiner

COMPUTER SYSTEM WITH NEAR FIELD AND FAR FIELD COMMUNICATION

RELATED APPLICATION INFORMATION

The present application is a divisional application of U.S. patent application Ser. No. 11/363,388 filed Feb. 27, 2006, U.S. Pat. No. 7,525,453, which is a continuation-in-part application of U.S. patent application Ser. No. 09/978,615 filed Oct. 16, 2001, U.S. Pat. No. 7,006,014, which claims the benefit pursuant to 35 USC §119(e) of the priority date of U.S. Provisional Patent Application Ser. No. 60/241,178, filed on Oct. 17, 2000, U.S. Provisional Patent Application Ser. No. 60/244,611, filed on Nov. 1, 2000 and U.S. Provisional Patent Application Ser. No. 60/257,479, filed on Dec. 21, 2000, the disclosures of which are hereby expressly incorporated herein by reference. The present application is also a continuation-in-part application of U.S. patent application Ser. No. 10/003,778 filed Oct. 31, 2001, U.S. Pat. No. 7,027,039 and Ser. No. 10/027,369 filed Dec. 20, 2001 now abandoned the entire disclosures of which are hereby expressly incorporated herein by reference.

BACKGROUND OF THE INVENTION

1. Field of the Invention

The present invention relates to wireless controllers.

2. Description of the Prior Art and Related Information

Wireless keyboards have a number of advantages over the more common wire connected keyboards employed in computer systems. First of all, wireless keyboards offer more flexibility to the user to position him or her self relative to the computer. This can reduce strain and tiredness associated with computer use. Also, wireless keyboards reduce the amount of wires connected over or creates a cleaner look to the overall system and can give the computer system a more sophisticated and/or expensive look. This avoidance of wiring becomes increasingly significant as more add on peripherals are included in typical computer systems which can result in workplace clutter.

The wireless keyboards currently available are either infrared based or RF based transmission systems. The infrared systems are the simplest and least expensive, however, they require a line of sight to the receiver. This can result in inconsistent transmission as the keyboard is moved or if other objects block the transmission path. RF systems do not suffer from this problem but are more expensive than infrared systems. In particular, the reliability of transmission in RF systems at a given range depends on the RF frequency and the power and quality of the transmitter. Therefore, maintaining transmission reliability requires more expensive higher frequency transmitters and/or higher power transmitters. Nonetheless, RF systems are increasingly being used for wireless keyboards over infrared systems due to their performance advantages.

Undoubtedly the primary reason that wireless keyboards have not displaced wire connected keyboards to a greater extent is the need for replacing batteries. When batteries fail in a wireless keyboard computer system the system is useless until the batteries are replaced. This is obviously a significant inconvenience when the battery failure is not expected. Also, keyboards typically continuously scan the matrix of keys to detect key depression. Therefore, even when there is no data entry from the keyboard battery power is being used for key scanning. Therefore, battery lifetime is inherently limited in wireless keyboards.

As a result of these limitations wireless keyboards have not been able to fulfill the potential of replacing wired keyboards in computer systems.

SUMMARY OF THE INVENTION

In one aspect the present invention provides a computer system comprising a computer receiver adapted to receive wireless input from first and second input devices employing different RF wireless communication modes and including shared circuitry for processing both communication modes. The receiver outputs an interrogating field and at least one of the first and second wireless input devices modulates the interrogating field which is detected by the receiver. The receiver communicates with the first device in a near field communication mode and the receiver communicates with the second device in a far field communication mode and the receiver comprises a first antenna adapted for near field communication and a second antenna adapted for far field communication. The first input device may be a wireless mouse and the second input device a wireless keyboard or the first input device may be a wireless keyboard and the second input device a wireless mouse.

Further features and aspects of the invention are also provided as will be appreciated from the following detailed description of the invention.

BRIEF DESCRIPTION OF THE DRAWINGS

FIGS. 1A and 1B are a drawings of a computer system with a passive wireless keyboard in accordance with two embodiments of the present invention.

FIG. 2 is a cutaway view of the wireless keyboard of FIG. 1A or 1B illustrating the transponder ID tags and antenna employed in the keyboard.

FIG. 3 is a schematic drawing of a circuit of the wireless mouse employed in one embodiment of the computer system of FIG. 1B.

FIG. 4 is a block diagram of the tag reader electronics employed in the computer system of FIG. 1A or 1B.

FIG. 5 is a block diagram of the tag reader in an alternate embodiment.

FIGS. 6A and 6B are top and sectional views of a multilayer keyboard employing a planar antenna design.

Figure 7:
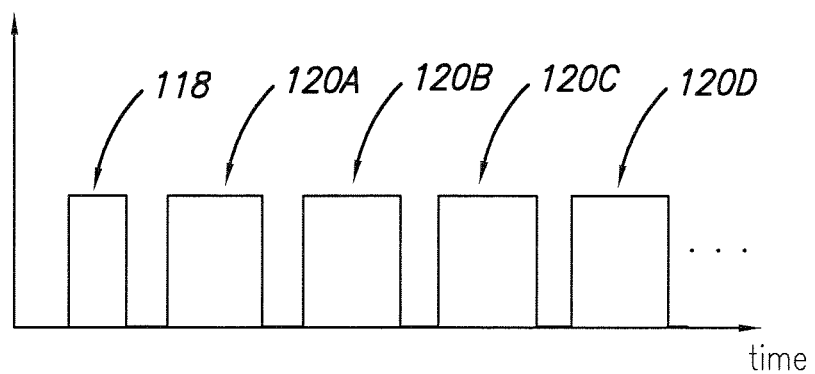
FIG. 7 is a timing diagram illustrating the use of unique time slots for simultaneously activated keys.

FIG. 7 is a timing diagram illustrating the use of unique time slots for simultaneously activated keys.

DETAILED DESCRIPTION OF THE INVENTION

Referring to FIGS. 1A and 1B, a computer system incorporating a passive wireless keyboard 10 and a wireless mouse 12 is illustrated. Keyboard 10 may be a QWERTY keyboard of an integral one piece conventional construction or may incorporate a folding design such as disclosed in U.S. Pat. No. 6,094,156 the disclosure of which is incorporated herein by reference in its entirety. The computer system as illustrated also includes a housing 14 which includes the processor, hard disk drive, and other components in a conventional computer system, as well as a reader unit which is the source of an interrogating field 16 which is used to interrogate the passive keyboard 10 and receive wireless transmission from wireless mouse 12. The wireless mouse may employ passive or active wireless transmission as described below. The computer system also includes a monitor 18 which may be a CRT or LCD type of display or other display known in the computer art. Interrogating field 16 is an RF modulated field generated by the reader and applied to a suitable antenna, contained within housing 14. Optionally the reader and/or the antenna may be contained within monitor 18. Alternatively, the reader may be incorporated in an add-on unit which interfaces with the computer housing 14 through an available port, such as a USB port, or the keyboard input.

Each key in keyboard 10 couples a passive transponder to the interrogating field 16 when a key is activated and provides a coded response to the reader which indicates the key activated. For example, the activation of a key in the keyboard 10 may close a switch that connects the transponder corresponding to that key to its antenna thereby allowing it to couple to the interrogating field 16 and provide a coded response to the reader in the computer housing 14 or may couple/decouple the antenna by tuning/detuning the circuit. Each transponder corresponding to a given key in the keyboard 10 has a unique code identifying the key which is read by the reader and thus provides an identification of the specific key activation to the computer processor.

A variety of passive transponder tags (or RFID tags) are known, however, most of these are limited in range. Such passive tags are primarily used in security systems and inventory tracking. Such tags typically include an antenna and integrated circuit which are combined in a small package and provided at a relatively low-cost. The antenna is used by the passive transponder to receive energy from the interrogating field which energy is used by the transponder to provide the coded response to the interrogating signal. The need for the passive transponder to receive energy from the interrogating field is a primary range limitation, often limiting the read range to a few cm where a small size inductive antenna is used in the reader to supply power. Longer range systems often employ very large reader antennas, for example, in passive RFID tag based security access systems or theft detection systems reader antennas are typically dimensioned on the order of size of a doorway or access portal. It is desirable to increase the range of the wireless keyboard without employing such large reader antennas. Several approaches to range increases are described in the above noted U.S. patent application Ser. No. 09/978,615 ('615 application) which take advantage of the different aspects of the present application. SAW (Surface Acoustic Wave) passive transponder tags have advantageous features for combination with the present invention. SAW tags and readers employ backscatter transmission coded in the time domain using a reflected series of pulses which are delayed to avoid noise due to reflections from the environment. SAW tags do not need power from the interrogating field so they can have increased read range. SAW tags as well as readers suitable for reading the response from such tags are well known and commercially available. For example, such tags and readers are available from RF SAW, Inc. Also, the following patents disclose SAW RFID tags and readers; U.S. Pat. No. 6,966,493, U.S. Pat. No. 6,958,696, U.S. Pat. No. 6,919,802, U.S. Pat. No. 6,759,789, U.S. Pat. Nos. 6,756,880, 6,708,881, the disclosures of which are incorporated herein by reference in their entirety. Also, the RFID Handbook, second edition, 2003, Wiley Pub., by Klaus Finkenzeller discloses details of SAW RFID tags and readers, the disclosure of which is incorporated herein by reference (the relevant portions thereof will be readily appreciated by those skilled in the art). A time delayed backscatter modulator may also be implemented on the keyboard using discrete components including a delay line coupled to the antenna. Other backscatter tags and reader systems may also be employed. Various backscatter modulator circuit designs and approaches are known; for example, as set out in the above noted RFID Handbook. In addition to these and other known teachings the teachings of U.S. Pat. No. 6,243,012 may be employed, the disclosure of which is incorporated herein by reference. Also, non backscatter systems may be employed and several are described in the '615 application. Selection of the system will involve the desired range and cost of the application.

Referring to FIG. 2 a portion of keyboard 10 is illustrated showing a portion of an array of passive transponder ID tags 20. Such tags may comprise SAW tags and specifics of the design of tags 20 may be found in the above noted United States patents. Each ID tag 20 comprises a chip storing a unique code for the specific key of the keyboard 10 to which the tag 20 corresponds. Also as shown each tag 20 is coupled via a switch 22 to an antenna 24. When a key is activated by the keyboard user the depression of the key closes switch 22 thereby coupling the individual ID tag 20 to the antenna 24. This allows the tag to couple to the interrogating field and reflect the field with a modulated response to provide its unique code to the reader. Each tag 20 may have its own antenna. As antenna size can limit read range, however, it is generally desirable to have as large an antenna reflective signature as possible associated with each tag. This may be achieved by providing a common antenna to which is coupled a plurality of individual tags 20. This allows an antenna 24 to be dimensioned larger than in typical passive RFID applications up to substantially the entire size of the keyboard which can provide substantial increases in coupling to the interrogating field and corresponding increases in the read distance and read speed and integrity. Although the antenna 24 is illustrated as a simple dipole antenna 24 it will be appreciated that other antenna types are possible, including a multi-wire folded dipole. Also, the antenna 24 may be formed on a separate layer of the keyboard from the tags 20 with a connection 26 provided between the antenna layer and the layer on which the tags 20 are formed allowing the use of a patch antenna 24 or an antenna comprising an array of patches or microstrip lines. Whether the antenna 24 is on the same substrate as the tags 20 or a separate substrate the antennas may advantageously be formed using printed circuit board techniques to ease assembly and reduce costs.

Still referring to FIG. 2, in one embodiment of tag antenna 24 separate antennas 24 may be provided for different groups of keys. The number of separate antennas provided may be chosen to reduce or eliminate the possibility of simultaneously activated keys sharing an antenna during normal keyboard usage. This may reduce interference in the read operation between such simultaneously activated keys. For example, for a typical computer keyboard with CTRL, ALT and SHIFT keys adapted for use together with other keys, these may each be coupled to a separate antenna 24. A separate antenna 24 could then couple to the remaining keys, including all the text keys. Additional or fewer antennas may be provided for specific keyboard functionality. Alternatively, the antenna/key grouping may be chosen for optimal coupling and/or optimal layout of a printed circuit with the antennas and tag connections on the keyboard. For example, the keys may be coupled in columns to antennas arranged in rows along the top (as schematically illustrated) and bottom of the keyboard. Preferably, as noted above, the antennas in total exploit a substantial portion of the keyboard area to maximize read range Referring to FIG. 3, an implementation of a wireless mouse 12 circuit is illustrated. If mouse 12 employs mechanical position encoders the use of passive transmission of the position information may be employed as described in more detail in U.S. patent application Ser. No. 10/003,778. If an optical position encoder is desired an active backscatter transmission may be employed as shown in FIG. 3. A conventional optical tracking circuit 28 may be employed which is coupled to an active backscatter transmitter comprising modulator 30 and antenna 32. The active backscatter modulator may employ the same general design as passive backscatter modulators described above, e.g. the '012 patent or RFID Handbook, with the power provided from the battery and the modulation input coming from the position input rather than stored in an IC. The optical tracking circuit and modulator are powered by battery 34, however, the transmitter does not need to power the transmission through the antenna since backscatter/reflective transmission of the interrogating field is employed. This embodiment has the advantage of reduced power consumption over conventional wireless optical mouse systems which power RF transmission with a battery. Such systems are known to have relatively short battery lifetime and accordingly the extended battery lifetime with the present embodiment is a desirable improvement. Also, a shared reader may be employed with the wireless keyboard.

Referring to FIG. 4 a reader block diagram is illustrated. As noted above reader designs are known and are described in the above patents and in the above noted RFID Handbook, by Klaus Finkenzeller (chapter 11), and need not be described in detail herein; however, FIG. 4 illustrates aspects of the reader adapted for the present application. As shown the reader includes a key reader and decoder 40 and a mouse reader and decoder 42. If a SAW type tag is employed on the keyboard 10 and an active modulated backscatter system employed for wireless mouse 12, the interrogating field will be pulsed for the keyboard and continuous for the mouse and appropriate reader circuits employed. These may each be operable at different frequencies. Also each may have plural frequencies f1-fn. Plural frequencies for the key reader may prevent interference from simultaneously operated keys and may be limited to commonly activated keys such as ctrl, shift, alt, etc. Mouse decoder in turn may use plural frequencies as described in the '778 application. Other techniques for preventing interference from multiple tags being read simultaneously are known and may be employed instead of assigning unique frequencies to the commonly activated tags. For example, a protocol where a tag issues a brief response in a unique time slot or where a random response timing is used can minimize inter-tag interference without separate frequencies.

The decoded key and mouse information is provided to control processing circuit 44 which converts the decoded information to conventionally formatted key and mouse control data which is provided to the computer processor on line 46. Some or all of the functions of circuit 44 (as well as some functions of decoders 40, 42) may be provided in the computer processor, however, and this may provide cost advantages.

Referring to FIG. 5 a reader block diagram is illustrated which shares circuitry with a wireless networking circuit. Such wireless networking circuits are well known, for example as defined in the WiFi specification, and as used herein also includes systems such as Bluetooth. 2.45 GHz is a commonly used frequency for such systems and 2.45 GHz SAW tags are also available. This combined circuit has advantages in space and cost for computer systems having such a wireless networking capability and for example the wireless network and key/mouse reader circuitry may be configured on a single circuit board. As shown the combined reader and wireless networking circuit 50 may include a shared antenna 52 coupled to key reader circuit block 54, wireless network circuit block 56 and mouse reader circuit block 58 via selective coupler 60. If the same antenna is used for transmit and receive the coupler may include a directional coupler and a switch (the double arrow lines may comprise separate signal paths from the directional coupler and are illustrated in this manner for convenience of illustration). The switching circuitry receives timing control signals from either of the circuit blocks which timing is communicated between the blocks via lines 62, 64. If the respective circuit blocks operate at different frequencies the selective coupler may also include filters to block the signal components of the other circuit blocks. The outputs of the key and mouse reader are provided to the computer system processor along lines 66, 68 and the wireless network bidirectional communication is along line 70. Although a shared antenna provides space advantages and some cost savings additional functions may be shared between circuit blocks. For example, circuit block 56 may control all transmit signals with separate decode blocks used for receiving and decoding functions. Alternatively, separate transmit circuits may be provided but a common decode block employed in circuit block 56. Finally, all functions may be implemented in a common block 56.

A discrimination processing may be implemented by the readers of FIG. 4 or 5 which allows multiple wireless keyboards to be used in relatively close proximity without interference. A first processing approach takes advantage of the distance detection feature of SAW tags and readers. In this approach the reader detects a coded response and the distance and compares it to a predetermined maximum distance, e.g., 6, 8 or 10 feet. If the distance exceeds this amount the key detection is rejected. Alternatively the reader may output distance and key codes to the computer system processor which then compares the distance to the defined maximum and accepts or rejects the key code. In either case the distance may be user settable but this user distance setting capability may be more readily implemented where the distance discrimination is made in the computer system processor. Another discrimination processing approach may employ using different codes in different keyboards and storing the valid codes for the keyboard in a table in the reader or computer system. In this approach the reader detects a coded response and compares it to the table of valid codes and accepts or rejects the key code. As in the prior approach this discrimination processing alternatively may be performed by the computer system processor. To allow switching of keyboards between computers the table may be stored in a non-volatile memory on the keyboard accessible by the computer system via, e.g., a USB cable, or may be contained in a device driver, e.g., on a CD ROM or other storage, which ships with the keyboard.

FIGS. 6A and 6B are top and side sectional views of a keyboard 10 employing a multi-layer structure and a planar antenna design. Referring first to FIG. 6A, a layer of keyboard 10 is illustrated employing a planar antenna pattern thereon. The generally planar tag antenna 24 may employ known patch antenna or multi-stripline designs which may be configured on the keyboard housing or part of the housing. For example, patch antenna designs are described in the above noted RFID Handbook (Chapter 4). The planar pattern may be generally split across the keyboard into columns or rows of antennas 24 or antenna elements 28. Other configurations are also possible. The antenna configuration will be chosen for the specific implementation to maximize reflective coupling to the interrogating field from the reader. A second layer of keyboard 10 may comprise tags 20 and switches 22 connected to the tag antenna by connection 26, as described in relation to FIG. 2 above. The tag layer 82 may be configured on top of the antenna layer 84 as illustrated in FIG. 6B and connection 26 (FIG. 2) may connect to antenna 24 through conductive vias 80. Tags 20, switches 22 and connection 26 may be formed on a suitable substrate. The layer 86 with the keys thereon (shown in FIG. 1A) is configured on top of the tag layer with the keys aligned with switches 22.

As noted above antenna 24 may be optimized for the transmission of the data back to the reader, for example, to transmit data via backscatter modulation. For example, if a 2.45 GHz interrogating field is used approximately a half wavelength antenna or antenna element dimension may be employed. In addition to a patch antenna, for example, antenna 24 may be a half wavelength dipole antenna array configured over a substantial portion of the keyboard to provide a strong reflected signal. Plural antennas 24 may also be provided each respectively coupled to one or more circuits as described above. Plural antennas 24 may also be provided each respectively having a different orientation to reduce sensitivity to keyboard orientation. Also, other antenna designs may be employed, e.g., a bowtie antenna, multi-element half wavelength dipole, or folded dipole antenna design may be employed.

SAW tags and readers employ time domain decoding and this may be used to discriminate simultaneously activated keys by the use of unique time slots for simultaneously activated keys. This feature may exploit the teachings of FIG. 17 of the '615 application reproduced as FIG. 7 herein. The pattern illustrated may comprise a timing signal encoded in the reflective pattern in a SAW tag circuit. Timing 118 may indicate the beginning of the SAW read window (as initiated by timing circuitry in the reader to discriminate noise) and, for example, slot or code 120A may correspond to a first multi-function key (e.g., Ctrl), 120B a second multi-function key (e.g., Shift), 120C a third multi-function key (e.g., Alt), and 120D the alpha numeric keys (e.g., in a QWERTY keyboard).

It will be appreciated from the foregoing that the above described embodiments are purely illustrative examples and a variety of different implementations of both the system employing the keyboard, the reader and the keyboard itself are possible. For example, with respect to the overall system, depending on the keyboard read range of the system as implemented, the system employing the keyboard may also comprise an entertainment system as described in the above noted '156 patent, incorporated herein by reference, with the keyboard providing remote control input functions as described therein. Such an entertainment system may include a game system and the keys game control keys. Also, a variety of computing devices such as so called internet appliances and other desktop systems may employ the invention. Also, simpler controllers may employ the manually activated tag and reader as described with the manually activated input coupling the tag to the antenna as described to wirelessly initiate a control function with a coded response. Such a controller may have a single manual input such as a key or switch or plural manual inputs. Variations in the reader and tag implementations and layouts in turn are too numerous to describe in detail including a variety of different combinations of transmission schemes, antenna designs, modulation schemes, frequency ranges, etc.

What is claimed is:

1. A computer system, comprising:
a computer receiver adapted to receive wireless input from first and second input devices employing different RF wireless communication modes and including shared circuitry for processing both communication modes,
said receiver outputting an interrogating field and wherein at least one of said first and second wireless input devices modulates said interrogating field which is detected by said receiver, wherein
the receiver communicates with the first device in a near field communication mode and wherein the receiver communicates with said second device in a far field communication mode and the receiver comprises a first antenna adapted for near field communication and a second antenna adapted for far field communication,
wherein said first input device is a wireless mouse and said second input device is a wireless keyboard, or said first input device is a wireless keyboard and said second input device is a wireless mouse.

2. A computer system as set out in claim 1, wherein a second interrogating field is provided by the receiver and is modulated by the second device in the second communication mode.

* * * * *